(12) United States Patent
Vandeven et al.

(10) Patent No.: US 10,542,669 B2
(45) Date of Patent: Jan. 28, 2020

(54) MULTI-SECTION HEADER WITH OFFSET PIVOT AXIS

(71) Applicant: Deere & Company, Moline, IL (US)

(72) Inventors: Michael L. Vandeven, Princeton, IA (US); Joshua R. Pierson, Davenport, IA (US); Bryan R. Yanke, Elridge, IA (US); Alex Brimeyer, Bettendorf, IA (US)

(73) Assignee: Deere & Company, Moline, IL (US)

( * ) Notice: Subject to any disclaimer, the term of this patent is extended or adjusted under 35 U.S.C. 154(b) by 36 days.

(21) Appl. No.: 15/499,952

(22) Filed: Apr. 28, 2017

(65) Prior Publication Data

US 2018/0310472 A1   Nov. 1, 2018

(51) Int. Cl.
*A01D 34/28* (2006.01)
*A01D 34/04* (2006.01)
*A01D 101/00* (2006.01)

(52) U.S. Cl.
CPC .......... *A01D 34/283* (2013.01); *A01D 34/04* (2013.01); *A01D 2101/00* (2013.01)

(58) Field of Classification Search
CPC ......... A01B 73/00; A01B 73/02; A01B 73/04; A01B 73/042; A01B 73/044; A01D 34/283; A01D 34/04; A01D 34/286; A01D 34/28; A01D 2101/00; A01D 41/06; A01D 41/14; A01D 41/144; A01D 47/00; A01D 57/20; A01D 57/26
See application file for complete search history.

(56) References Cited

U.S. PATENT DOCUMENTS

| | | | |
|---|---|---|---|
| 3,468,107 A * | 9/1969 | Van Der Lely | A01D 41/144 56/11.9 |
| 3,683,601 A | 8/1972 | Van Der Lely | |
| 4,126,189 A * | 11/1978 | Channel | A01B 73/044 172/456 |
| 4,487,004 A * | 12/1984 | Kejr | A01D 41/14 56/14.4 |
| 6,675,568 B2 | 1/2004 | Patterson et al. | |
| 7,540,130 B2 * | 6/2009 | Coers | A01D 41/141 56/10.2 E |
| 7,992,372 B1 * | 8/2011 | Coers | A01D 41/14 56/153 |
| 8,635,842 B2 | 1/2014 | Markt | |
| 9,198,353 B2 * | 12/2015 | Ritter | A01D 45/025 |
| 9,526,206 B2 * | 12/2016 | Schulze Ruckamp | A01D 41/06 |
| 9,992,924 B2 * | 6/2018 | van Vooren | A01D 41/144 |

(Continued)

FOREIGN PATENT DOCUMENTS

| | | |
|---|---|---|
| CA | 1267292 A | 4/1990 |
| DE | 4103011 A1 | 8/1992 |

(Continued)

OTHER PUBLICATIONS

Search Report issued in counterpart application No. EP18169478.7, dated Aug. 7, 2018 (7 pages).

*Primary Examiner* — Alicia Torres
*Assistant Examiner* — Adam J Behrens
(74) *Attorney, Agent, or Firm* — Rathe Lindenbaum LLP (57) ABSTRACT

An agricultural harvesting head has three frame sections. Each frame section is pivotally coupled to its adjacent frame section by two links. The two links are pivotally coupled to the two adjacent frame sections at both ends of each link.

19 Claims, 5 Drawing Sheets

(56) References Cited

U.S. PATENT DOCUMENTS

| | | | | |
|---|---|---|---|---|
| 10,070,575 | B2* | 9/2018 | Wenger | A01B 73/065 |
| 2002/0005629 | A1* | 1/2002 | Rosenboom | A01B 51/04 |
| | | | | 280/651 |
| 2003/0226342 | A1* | 12/2003 | Boeckmann | A01D 41/144 |
| | | | | 56/14.7 |
| 2014/0075909 | A1* | 3/2014 | Bomleny | A01D 41/144 |
| | | | | 56/119 |
| 2015/0373907 | A1* | 12/2015 | Schulze Ruckamp | ........................ |
| | | | | A01D 41/16 |
| | | | | 56/246 |
| 2016/0262301 | A1* | 9/2016 | van Vooren | A01B 73/06 |
| 2018/0035598 | A1* | 2/2018 | Wenger | A01B 73/065 |

FOREIGN PATENT DOCUMENTS

| | | | |
|---|---|---|---|
| DE | 60113599 | T2 | 6/2006 |
| EP | 3278653 | A1 | 2/2018 |

* cited by examiner

MULTI-SECTION HEADER WITH OFFSET PIVOT AXIS

FIELD OF THE INVENTION

This invention relates generally to agricultural harvesters. More particularly it relates to agricultural harvesting heads for agricultural combines. More particularly it relates to agricultural harvesting heads with multiple sections that are coupled together to pivot with respect to each other.

BACKGROUND OF THE INVENTION

Agricultural harvesters, such as agricultural combines, are designed to travel through agricultural fields harvesting crops. Agricultural combines receive crop severed from the ground and convey it to threshing, separating and cleaning devices within the agricultural combine.

In a typical arrangement, the agricultural harvesting head severs the crop from the ground and conveys it to the central region of the harvesting head where it is then conveyed rearward into a central and forwardly opening aperture in the front of the agricultural combine proper.

Agricultural harvesting heads are quite long, on the order of 10-15 m in overall length. In order to accurately follow the contours of the ground and sever crop at the appropriate point on the stem, agricultural harvesting heads have been made in sections that are generally hinged with respect to each other. A typical agricultural harvesting head of this type is formed in two or three sections that are pivotable with respect to each other. They pivot with respect to each other about a generally horizontal and fore-and-aft extending axis. Thus, a two section agricultural harvesting head would have one pivot axis, and a three-section agricultural harvesting head would have two pivot axes.

In the past, simple pivots or hinges were provided to permit the sections to pivot with respect to each other.

See, for example U.S. Pat. No. 9,198,353 (B2). In the '353 patent, a left frame section and a right frame section are hinged to a wide center frame section. Both the front pivot joint and the rear pivot joint between the frames are located off to one side of the center frame and away from the central aperture in the center frame through which cut crop passes during operation.

In another arrangement (U.S. Pat. No. 6,675,568 B2) the agricultural harvesting head is a draper head having three frame sections (a center section, a left wing section and a right wing section). In this arrangement each of the wing sections are hinged with respect to the center section about two pivot joints with pivot pins (see: FIG. 6, items 17H, 27; FIG. 20, items 71A, 71B). In this arrangement, the pivot joints define a pivot line that is disposed outboard of the center frame and outside of the central aperture in the center frame through which cut crop is transmitted during operation. The wing sections pivot with respect to the center section about these pivot joints.

To provide space for other mechanical elements and/or crop flow at the rear of the agricultural harvesting head, it would be beneficial to eliminate the simple hinge joint/hinge pin arrangement at the rear of the harvesting head, yet still constrain the two frame sections to pivot about a generally forward extending axis. It is an object of this invention to provide these advantages in one or more of the embodiments described in one or more of the claims below.

SUMMARY OF THE INVENTION

In accordance with a first aspect of the invention, an agricultural harvesting head for an agricultural harvester is provided, including: a left frame section; a center frame section; an upper left link pivotally coupled to the left frame section at a distal end of the upper left link and pivotally coupled to the center frame section at a proximal end of the upper left link; a lower left link pivotally coupled to the left frame section at a distal end of the lower left link and pivotally coupled to the center frame section at a proximal end of the lower left link; a right frame section; an upper right link pivotally coupled to the right frame section at a distal end of the upper right link and pivotally coupled to the center frame section at a proximal end of the upper right link; and a lower right link pivotally coupled to the right frame section at a distal end of the lower right link and pivotally coupled to the center frame section at a proximal end of the lower right link.

The upper left link and the lower left link may constrain the left frame section to pivot up and down with respect to the center frame section about a first point.

The upper right link and the lower right link may constrain the right frame section to pivot up and down with respect to the center frame section about a second point.

The center frame section may define a large central aperture that defines a longitudinally extending cut crop flow path passing through the center frame section, and the first point and the second point maybe disposed inside the large central aperture.

The upper left link may be pivotally coupled to the left frame section at a first pivot point, the upper left link may be pivotally coupled to the center frame section at a second pivot point, the lower left link may be pivotally coupled to the left frame section at a third pivot point, the lower left link may be pivotally coupled to the center frame section at a fourth pivot point, and the first and second pivot points may be disposed above the third and fourth pivot points.

The upper left link may be disposed above the lower left link.

The upper right link may be pivotally coupled to the right frame section at a first pivot point, the upper right link may be pivotally coupled to the center frame section at a second pivot point, the lower right link may be pivotally coupled to the right frame section at a third pivot point, the lower right link may be pivotally coupled to the center frame section at a fourth pivot point, and the first and second pivot points may be disposed above the third and fourth pivot points.

The upper right link maybe disposed above the lower right link.

The left frame section may be elongate and may be coupled to and extend longitudinally away from a left side of the center frame section to which it is coupled, and the right frame section may be elongate and may be coupled to and extend longitudinally away from a right side of the center frame section.

Each of the left frame section, the center frame section, and the right frame section may support a corresponding endless belt conveyor, and each endless belt conveyor may include an endless belt and at least a proximal roller and a distal roller about which the endless belt recirculates, and the proximal roller of the conveyor of the left frame section may rotate about an axis of rotation that is collinear with a pivot axis about which the left frame section is constrained to pivot with respect to the center frame section, and the proximal roller of the conveyor of the right frame section may rotate about an axis of rotation that is collinear with a pivot axis about which the right frame section is constrained to pivot with respect to the center frame section.

The left frame section, the center frame section and the right frame section may have forwardly extending members to which a reciprocating knife is attached.

A first conveyor may be supported on the left frame section and may include a first generally planar upper conveying surface, and a second conveyor may be supported on the right frame section and may include a second generally planar upper conveying surface, and the first conveying surface and the second conveying surface may be coplanar in at least one operating position.

The upper left link may couple the left frame section to the center frame section by attachment to a first pivot joint on the left frame section and by attachment to a second pivot joint on the center frame section, wherein the first pivot joint is disposed above the second pivot joint.

The upper right link may couple the right frame section to the center frame section by attachment to a third pivot joint on the right frame section and by attachment to fourth pivot joint on the center frame section, wherein the third pivot joint is disposed above the fourth pivot joint.

The upper left link and the lower left link may be coupled to both the left frame section and the center frame section to pivot with respect to each section about generally horizontal and fore-and-aft extending pivot axes.

The upper right link and the lower right link may be coupled to both the right frame section and the center frame section to pivot with respect to each section about generally horizontal and fore-and-aft extending pivot axes.

DETAILED DESCRIPTION OF THE PREFERRED EMBODIMENTS

Figure 1:
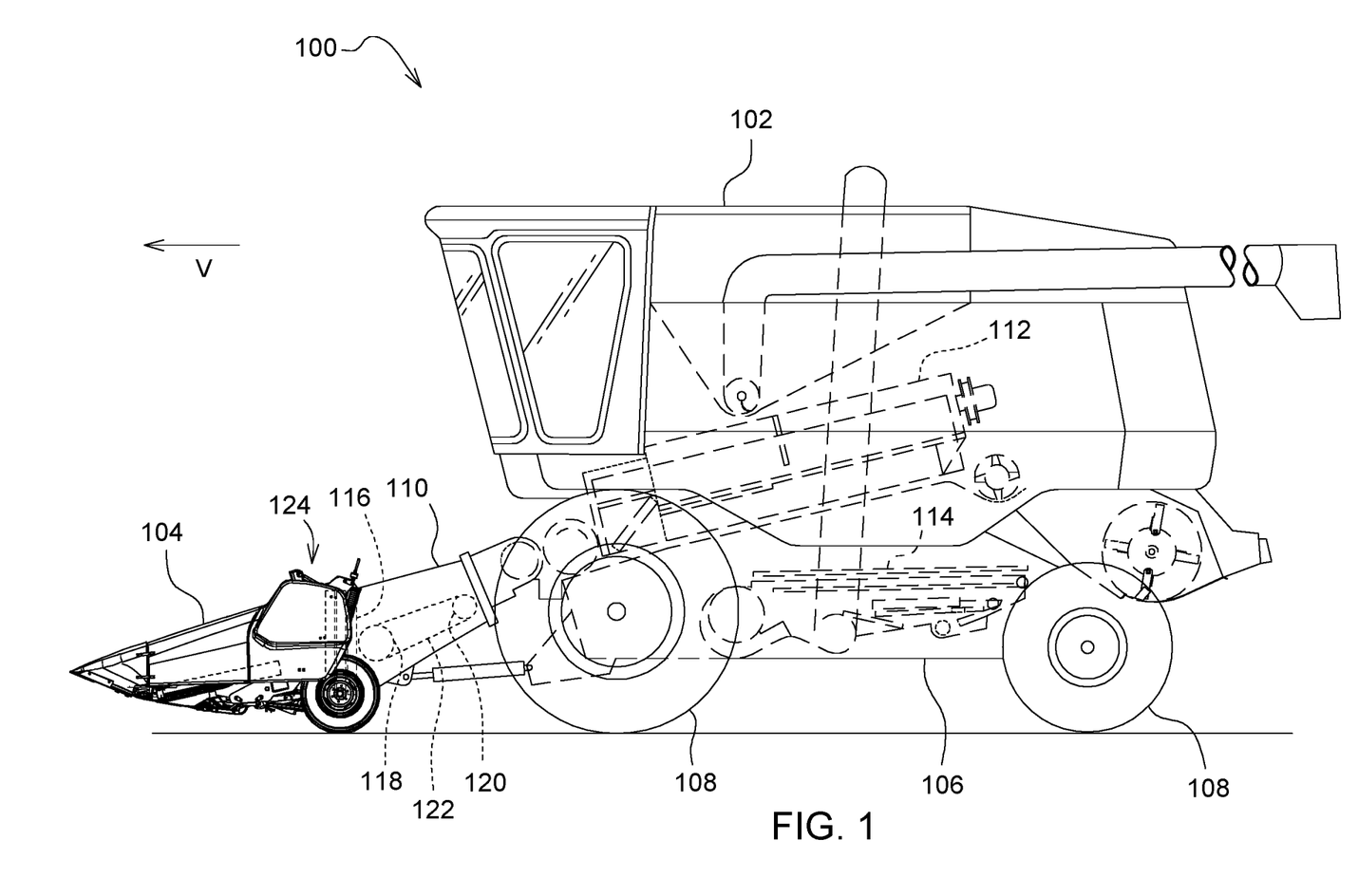
FIG. 1 illustrates an agricultural harvester in side view in accordance with the present invention.

In FIG. 1, an agricultural harvester 100 comprises an agricultural combine 102 and an agricultural harvesting head 104. The agricultural combine 102 comprises a chassis 106 which is supported on four ground supports 108, as well as a threshing and separating system 112, a cleaning system 114, and a feederhouse 110 extending forward from the front of the agricultural combine 102. The agricultural combine 102 further comprises a grain storage chamber (also known as a "grain tank" or "grain reservoir") that is disposed at the top of the agricultural combine 102 and receives grain that has been threshed, separated, and cleaned.

The agricultural combine 102 is a self-propelled vehicle which is driven over the ground by a power source such as electric motors or internal combustion engines. The ground supports 108 are preferably wheels or tracks. At least two of them are driven in rotation by motors to propel the agricultural combine 102 over the ground.

The feederhouse 110 is pivotally connected to the front of the agricultural combine and extends forward therefrom. The feederhouse 110 is generally in the form of a hollow and generally rectangular box having an endless belt conveyor disposed inside. The hollow rectangular box has an open forward end and an open rear end. The forward end of the feederhouse 110 defines a generally rectangular and robust frame 116 that is configured to support the agricultural harvesting head 104. A front roller 118 is disposed immediately inside the frame 116. A corresponding rear roller 120 is disposed at the rear end of the feederhouse 110. The front roller 118 and the rear roller 120 support opposing ends of a conveyor belt 122. Each of the front roller 118 and the rear roller 120 may be in the form of a narrow shaft with a plurality of sprockets or gears that engage the inner surface of the conveyor belt 122. A rotary motor (electric or hydraulic) is coupled to the rear roller 120 to drive the rear roller 120 in rotation. This rotation causes the conveyor belt 122 to recirculate in an endless fashion around the front roller 118 and the rear roller 120. The conveyor belt 122 has protrusions, such as cleats or lugs that engage a top surface of a mat of cut crop (not shown) that is presented to the frame 116. The movement of the conveyor belt 122 draws the mat into the feederhouse and carries it upward on the floor of the feederhouse until it is conveyed through the open rear end of the feederhouse 110 and sent to the threshing, separating and cleaning systems of the agricultural combine 102.

The frame 116 is generally rectangular and includes a top member and a bottom member that are generally parallel to each other, are spaced apart, extend generally parallel to the longitudinal extent of the agricultural harvesting head 104, and extend horizontally. The frame 116 also includes a left side member and a right side member that are parallel to each other, spaced apart, and extend vertically.

Figure 2:
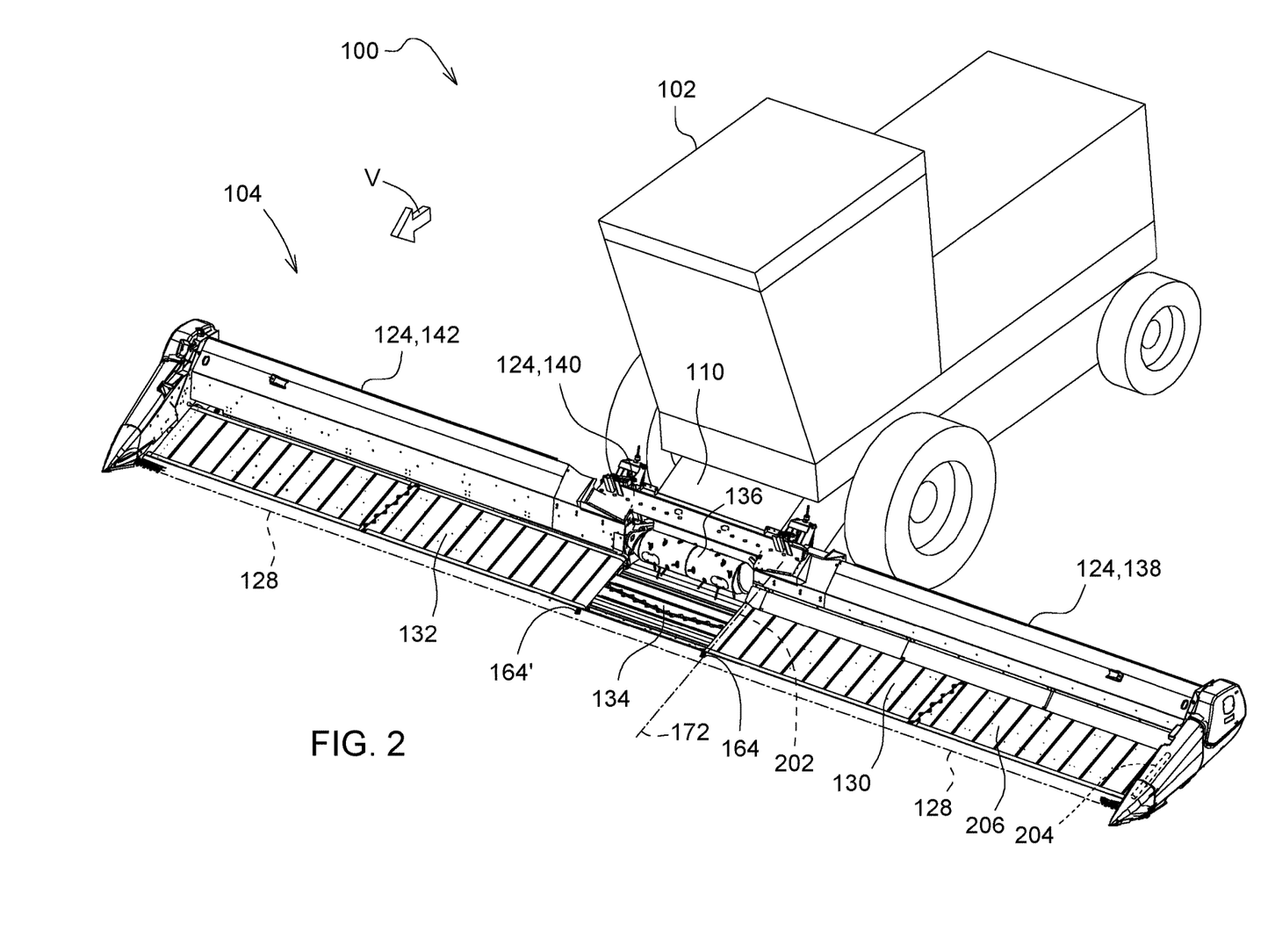
FIG. 2 illustrates the agricultural harvester of FIG. 1 in front-left perspective view and showing details of the agricultural harvesting head.

The agricultural harvesting head 104 includes a laterally extending main frame 124 that extends perpendicular to a fore-and-aft harvesting direction of travel "V" of the agricultural harvester 100 and perpendicular to the longitudinal axis of the agricultural combine 102. The agricultural harvesting head 104 further includes an elongate reciprocating knife 128 that extends across almost the entire width of the agricultural harvesting head 104. This reciprocating knife is disposed immediately in front of three cut crop conveyors. These three cut crop conveyors include a left side conveyor 130 that carries cut crop from the left side of the agricultural harvesting head 104 to a central region of the agricultural harvesting head 104, a right side conveyor 132 that carries crop from the right side of the agricultural harvesting head 104 to the central region of the agricultural harvesting head 104, and a central conveyor 134 that receives crop from the left side conveyor 130 and the right side conveyor 132, and conveys the cut crop rearward and underneath a drum conveyor 136. Each of these three conveyors is an endless belt conveyor and is disposed immediately behind the reciprocating knife 128 to receive crop cut by the reciprocating knife 128.

The laterally extending main frame 124 includes three frame sections that are coupled together to pivot with respect to each other about fore-and-aft extending axes. Left frame section 138 extends from the outer left end of the agricultural harvesting head to a central region of the agricultural harvesting head 104. Center frame section 140 extends across a middle portion of the agricultural harvesting head 104. Right frame section 142 extends from the outer right end of the agricultural harvesting head 104 to the central region of the agricultural harvesting head 104.

The left side of conveyor 130 is supported on the left frame section 138. Several rollers, including a proximal roller 202 adjacent to the center frame section 140 and distal roller 204 adjacent to the leftmost end of the left frame section 138 are provided to support an endless belt 206. A motor (not shown) drives the proximal roller 202 in rotation. The proximal roller 202 recirculates in turn the endless belt 206 about the proximal roller 202 and the distal roller 204. Crop material cut by the reciprocating knife 128 in front of the left frame section 138 falls upon the top surface of the endless belt 206 and is drawn toward the center frame section 140.

The inner end of the left frame section 138 is connected to the center frame section 140 to pivot up and down at its outer end with respect to the center frame section 140. The inner end of the right frame section 142 is connected to the center frame section 140 to pivot up and down at its outer end with respect to the center frame section 140.

Figure 3:
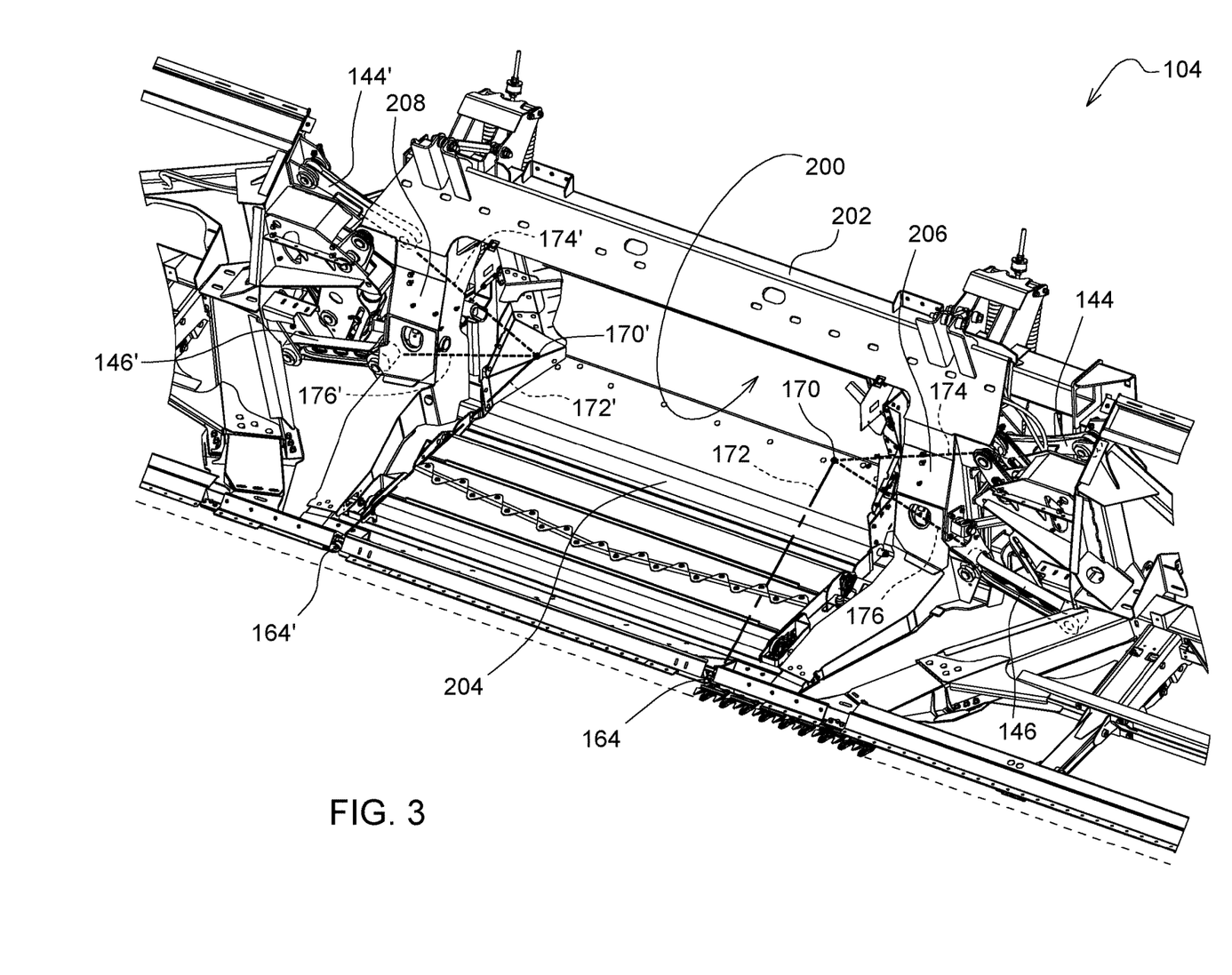
FIG. 3 is a fractional perspective view of the left, right, and center frame sections of the agricultural harvesting head of FIGS. 1-2 with the conveyors removed.

An upper left link 144 and a lower left link 146 extend between and couple the left frame section 138 and the center frame section 140.

A proximal end of the upper left link 144 is coupled to the center frame section 140 by a first pivot joint 148 and is configured to pivot with respect to the center frame section 140 about a first axis 150 that extends generally in the direction of travel "V".

An opposing distal end of the upper left link 144 is coupled to the left frame section 138 by a second pivot joint 152 and is configured to pivot with respect to the left frame section 138 about a second axis 154 that extends in the direction of travel "V".

A proximal end of the lower left link 146 is coupled to the center frame section 140 by a third pivot joint 156 and is configured to pivot with respect to the center frame section 140 about a third axis 158 that extends in the direction of travel "V".

An opposing distal end of the lower left link 146 is coupled to the left frame section 138 by a fourth pivot joint 160 and is configured to pivot with respect to the left frame section 138 about a second axis 162 that extends in the direction of travel "V".

A hinge joint 164 is disposed adjacent to the reciprocating knife 128 at a forward edge of the agricultural harvesting head 104. The hinge joint 164 couples a forwardly extending member 166 of the center frame section 140 to a forwardly extending member 168 of the left frame section 138.

The attachment points of the proximal ends of the upper left link 144 and the lower left link 146 are closer together (as measured in a vertical direction) than the attachment points of the distal ends of the upper left link 144 and the lower left link 146.

The two attachment points of the upper left link 144 define a first construction line 174 extending through both of the attachment points of the upper left link 144. The two attachment points of the lower left link 146 define a second construction line 176 extending through the attachment points of the lower left link 146.

Figure 4:
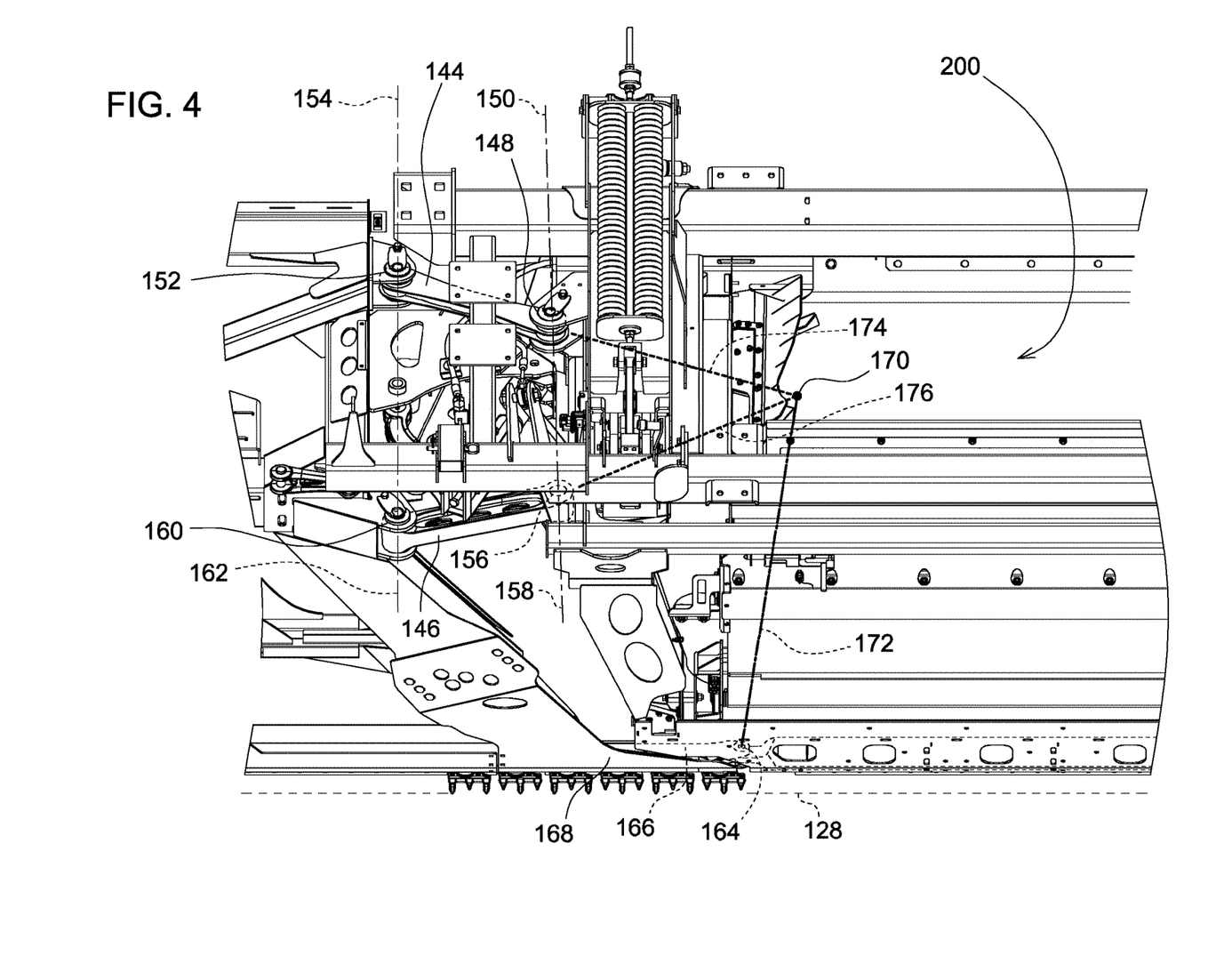
FIG. 4 is a fractional rear view of the left and center frame sections shown in FIG. 3.
Figure 5:
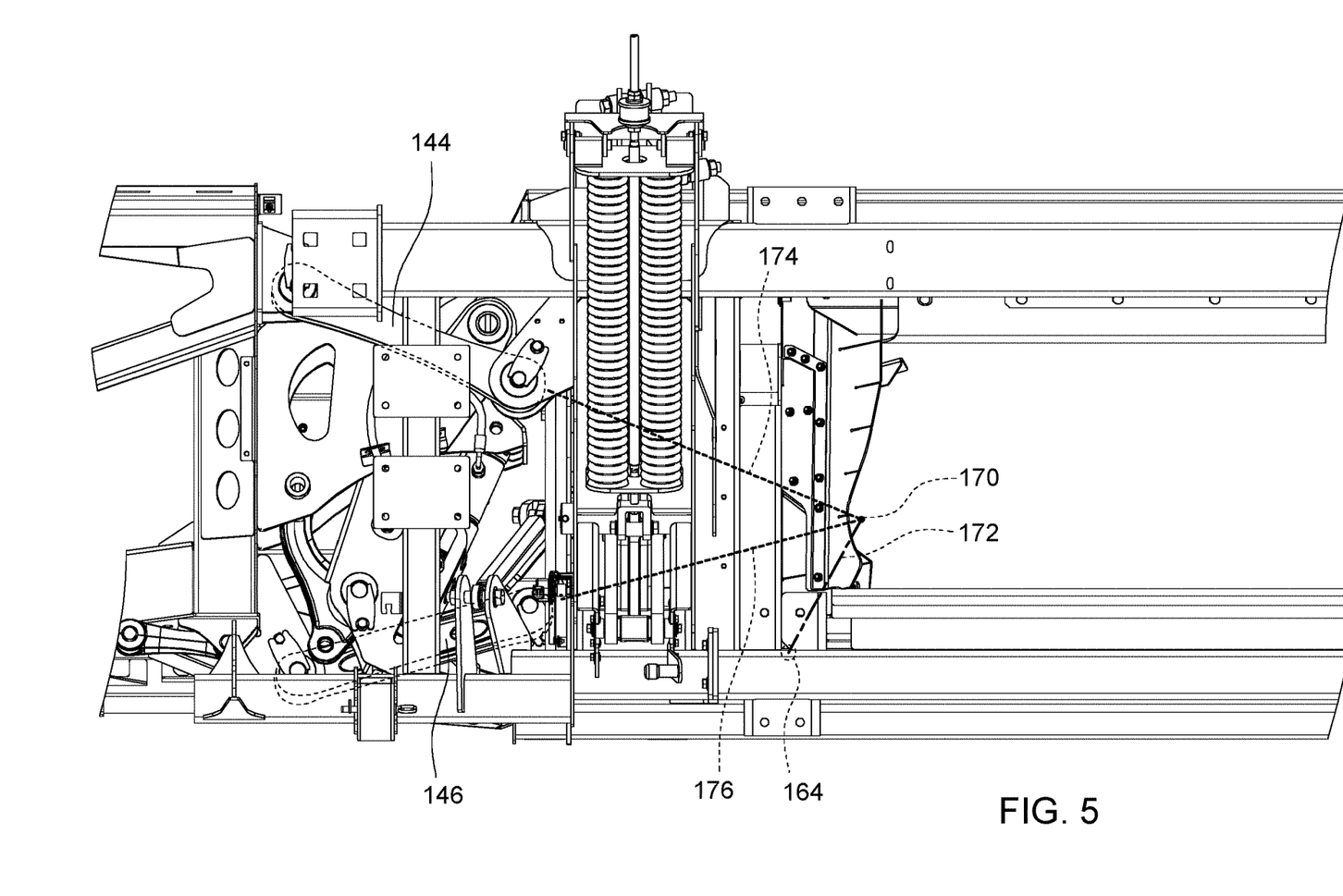
FIG. 5 is a slightly elevated fractional rear view of the left and center frame sections shown in FIGS. 3-4.

The first construction line and the second construction line are not parallel. When viewed from the rear of the agricultural harvesting head 104 they intersect each other at a point of intersection 170. Whenever the left frame section 138 pivots up and down with respect to the center frame section 140, these sections pivot with respect to each other about the point of intersection 170.

In the illustrated example, the point of intersection 170 is located closer to the longitudinal and vertical mid-plane of the center frame section 140 than all four of the attachment points of the upper left link 144 and the lower left link 146 to the left frame section 138 and the center frame section 140.

The pivoting axis of the hinge joint 164 is disposed forward of and slightly below the point of intersection 170 of the two construction lines. Thus, the left frame section 138 is constrained by the hinge joint 164, the upper left link 144 and the lower left link 146 to pivot with respect to the center frame section 140 about a pivot line 172 that extends through the point of intersection 170 and through the pivoting axis of the hinge joint 164. The pivot line 172 also extends through or immediately adjacent to the reciprocating knife 128. In this manner, whenever the left frame section 138 pivots with respect to the center frame section 140, the reciprocating knife 128 (which extends across both the left frame section 138 and the center frame section 140) can flex without being torn apart.

The center frame section 140 is in the form of a generally rectangular frame having generally horizontal and parallel top and bottom members 202, 204, and generally vertical and parallel left side and right side members 206, 208. These four members define the four sides of a central aperture 200. All of the cut crop material harvested by the agricultural harvesting head 104 passes through the central aperture 200. It is subsequently conveyed into the open front end of the feederhouse 110 and carried into the combine itself.

The reciprocating knife 128 is typically close to the ground where it can sever plant stalks close to the ground. The rear portion of the three frame sections, the upper left link 144 and the lower left link 146 are commonly elevated above the ground to provide ground clearance. For this reason, the pivot line 172 extends forward and slightly downwardly from the point of intersection 170 to the hinge joint 164.

The left side conveyor 130 is supported on the left frame section 138. The left side conveyor 130 includes several rollers that support an endless belt 206 for recirculating movement around the rollers. The several rollers include a proximal roller 202 that is located adjacent to the center frame section 140 and distal roller 204 that is located adjacent to the leftmost end of the left frame section 138.

The pivot line 172 extends through the proximal roller 202. The rotational axis of the proximal roller 202 is collinear with the pivot line 172. Thus, when the left frame section 138 pivots up and down with respect to the center frame section 140, the proximal roller 202 does not move with respect to the left frame section 138 and the center frame section 140. Further, since the frame sections do not move with respect to each other, the left side conveyor 130 and the central conveyor 134 do not move with respect to each other as well.

A rotary motor (not shown) is coupled to and drives the proximal roller 202 in rotation, which in turn recirculates an endless belt 206 about the proximal roller 202 and the distal roller 204. Crop material cut by the portion of the reciprocating knife 128 located in front of the left frame section 138 falls upon the top surface of the endless belt 206 and is drawn toward the center frame section 140.

The discussion above recites the construction and operation of the left frame section 138, left side conveyor 130 as well as the central conveyor 134 together with the center frame section 140.

The agricultural harvesting head 104, however, is in all material respects mirror symmetric about a longitudinally and vertically extending plane that passes through a lateral midpoint of the center frame section 140. Thus, the description above regarding the left frame section 138, left side conveyor 130, and center frame section 140, apply equally to the right frame section 142, the right side conveyor 132 and the center frame section 140. For convenience these mirror symmetric components are shown in FIG. 3 followed identified by their left side component number followed by a single quotation mark (e.g. 144', 146', 164', 170', 172', 174', and 176').

As best shown in FIG. 3, this mirror symmetric arrangement means that both left frame section 138 and the right frame section 142 pivot with respect to the center frame section 140 about pivot lines 172 and 172', respectively. Further, both of these pivot axes extend through the central aperture 200 of the center frame section 140.

In the discussion above, various components and axes are described as extending in a fore-and-aft direction, or extending in a direction parallel to a direction of travel "V", or extending horizontally or longitudinally, or laterally. During normal operation, these components are expected to move. Typically, they can be pivoted or tilted with respect to each other, with respect to the ground, or with respect to the combine during normal operation and therefore are not precisely horizontal, vertical, longitudinally extending or laterally extending.

The invention claimed is:

1. An agricultural harvesting head for an agricultural harvester comprising:
   a left frame section;
   a center frame section;
   an upper left link pivotally coupled to the left frame section about a first pivot axis at a distal end of the upper left link and pivotally coupled to the center frame section about a second pivot axis at a proximal end of the upper left link;
   a lower left link pivotally coupled to the left frame section about a third pivot axis at a distal end of the lower left link and pivotally coupled to the center frame section about a fourth pivot axis at a proximal end of the lower left link, wherein a first construction line extending through the first pivot axis and the second pivot axis intersects a second construction line extending through the third pivot axis and the fourth pivot axis;
   a right frame section;
   an upper right link pivotally coupled to the right frame section about a fifth pivot axis at a distal end of the upper right link and pivotally coupled to the center frame section about a sixth pivot axis at a proximal end of the upper right link; and
   a lower right link pivotally coupled to the right frame section about a seventh pivot axis at a distal end of the lower right link and pivotally coupled to the center frame section about an eighth pivot axis at a proximal end of the lower right link, wherein a third construction line extending through the fifth pivot axis and the sixth pivot axis intersects a fourth construction line extending through the seventh pivot axis and the eight pivot axis, wherein the upper left link and the lower left link constrain the left frame section to pivot up and down with respect to the center frame section about a first point at which the first construction line and the second construction line intersect.

2. The agricultural harvesting head of claim 1, wherein the upper right link and the lower right link constrain the right frame section to pivot up and down with respect to the center frame section about a second point at which the third construction line and the fourth construction line intersect.

3. The agricultural harvesting head of claim 2, wherein the center frame section defines a large central aperture that defines a longitudinally extending cut crop flow path passing through the center frame section; and wherein the first point and the second point are disposed inside the large central aperture.

4. The agricultural harvesting head of claim 1,
   wherein the upper left link is pivotally coupled to the left frame section at a first pivot point providing the first pivot axis,
   wherein the upper left link is pivotally coupled to the center frame section at a second pivot point providing the second pivot axis,
   wherein the lower left link is pivotally coupled to the left frame section at a third pivot point providing the third pivot axis,
   wherein the lower left link is pivotally coupled to the center frame section at a fourth pivot point providing the fourth pivot axis, and
   wherein the first and second pivot points are disposed above the third and fourth pivot points.

5. The agricultural harvesting head of claim 4, wherein the upper left link is disposed above the lower left link.

6. The agricultural harvesting head of claim 1,
   wherein the upper right link is pivotally coupled to the right frame section at a fifth pivot point providing the fifth pivot axis;
   wherein the upper right link is pivotally coupled to the center frame section at a sixth pivot point providing the sixth pivot axis;
   wherein the lower right link is pivotally coupled to the right frame section at a seventh pivot point providing the seventh pivot axis;
   wherein the lower right link is pivotally coupled to the center frame section at a eighth pivot point providing the eighth pivot axis; and
   wherein the first and second pivot points are disposed above the third and fourth pivot points.

7. The agricultural harvesting head of claim 6, wherein the upper right link is disposed above the lower right link.

8. The agricultural harvesting head of claim 1, wherein the left frame section is elongate and is coupled to and extends longitudinally away from a left side of the center frame section to which it is coupled, and wherein the right frame section is elongate and is coupled to and extends longitudinally away from a right side of the center frame section.

9. An agricultural harvesting head for an agricultural harvester comprising:
   a left frame section; a center frame section;
   an upper left link pivotally coupled to the left frame section at a distal end of the upper left link and pivotally coupled to the center frame section at a proximal end of the upper left link;
   a lower left link pivotally coupled to the left frame section at a distal end of the lower left link and pivotally coupled to the center frame section at a proximal end of the lower left link;
   a right frame section; an upper right link pivotally coupled to the right frame section at a distal end of the upper right link and pivotally coupled to the center frame section at a proximal end of the upper right link; and
   a lower right link pivotally coupled to the right frame section at a distal end of the lower right link and pivotally coupled to the center frame section at a proximal end of the lower right link, wherein each of the left frame section, the center frame section, and the right frame section supports a corresponding endless belt conveyor; wherein each endless belt conveyor comprises an endless belt and at least a proximal roller and a distal roller about which the endless belt recirculates;

wherein the proximal roller of the conveyor of the left frame section rotates about an axis of rotation that is collinear with a pivot axis about which the left frame section is constrained to pivot with respect to the center frame section; and wherein the proximal roller of the conveyor of the right frame section rotates about an axis of rotation that is collinear with a pivot axis about which the right frame section is constrained to pivot with respect to the center frame section.

10. The agricultural harvesting head of claim 1, wherein the left frame section, the center frame section and the right frame section have forwardly extending members to which a reciprocating knife is attached.

11. The agricultural harvesting head of claim 1, wherein a first conveyor is supported on the left frame section and includes a first generally planar upper conveying surface, a second conveyor is supported on the right frame section and includes a second generally planar upper conveying surface, and wherein the first conveying surface and the second conveying surface are coplanar in at least one operating position.

12. The agricultural harvesting head of claim 1, wherein the upper left link couples the left frame section to the center frame section by attachment to a first pivot joint on the left frame section and by attachment to a second pivot joint on the center frame section, wherein the first pivot joint is disposed above the second pivot joint and wherein the first pivot joint and the second pivot joint provide the first pivot axis and the second pivot axis, respectively.

13. The agricultural harvesting head of claim 12, wherein the upper right link couples the right frame section to the center frame section by attachment to a third pivot joint on the right frame section and by attachment to fourth pivot joint on the center frame section, wherein the third pivot joint is disposed above the fourth pivot joint and wherein the first pivot joint and the second pivot joint provide the third pivot axis and the fourth pivot axis, respectively.

14. The agricultural harvesting head of claim 1, wherein the upper left link and the lower left link are coupled to both the left frame section and the center frame section to pivot with respect to each section about generally horizontal and fore-and-aft extending pivot axes.

15. The agricultural harvesting head of claim 14, wherein the upper right link and the lower right link are coupled to both the right frame section and the center frame section to pivot with respect to each section about generally horizontal and fore-and-aft extending pivot axes.

16. The agricultural harvesting head of claim 15, wherein the center frame section includes a central aperture configured to convey all cut crop harvested by the harvesting head.

17. The agricultural harvesting head of claim 1, wherein the first pivot axis and the third pivot axis are spaced by a first vertical distance and wherein the second pivot axis and the fourth pivot axis are spaced by second vertical distance less than the first vertical distance.

18. The agricultural harvesting head of claim 1 further comprising a hinge joint coupling the center frame section to the left frame section adjacent a forward edge of the agricultural harvesting head, wherein a pivot line is formed extending through the first point and the hinge joint.

19. The agricultural harvesting head of claim 18, wherein the left frame section supports an endless belt conveyor comprising an endless belt and a proximal roller having an axis of rotation about which the endless belt recirculates, wherein the pivot line is collinear with the axis of rotation.

* * * * *